US012718587B2

(12) United States Patent
Waelivaara et al.

(10) Patent No.: US 12,718,587 B2
(45) Date of Patent: Aug. 25, 2026

(54) DEPTH IMAGE DATA STRUCTURE FOR STORING IMAGE DEPTH INFORMATION

(71) Applicant: QUALCOMM Incorporated, San Diego, CA (US)

(72) Inventors: Marcus Waelivaara, Linköping (SE); Billy Karl Gerhard Krig, Linköping (SE)

(73) Assignee: QUALCOMM Incorporated, San Diego, CA (US)

( * ) Notice: Subject to any disclaimer, the term of this patent is extended or adjusted under 35 U.S.C. 154(b) by 198 days.

(21) Appl. No.: 18/823,618

(22) Filed: Sep. 3, 2024

(65) Prior Publication Data

US 2026/0065689 A1 Mar. 5, 2026

(51) Int. Cl.

*G06V 20/58* (2022.01)
*G06T 7/11* (2017.01)
*G06T 7/521* (2017.01)

(52) U.S. Cl.

CPC ................ *G06V 20/58* (2022.01); *G06T 7/11* (2017.01); *G06T 7/521* (2017.01); *G06T 2207/10028* (2013.01); *G06T 2207/20021* (2013.01); *G06T 2207/30261* (2013.01)

(58) Field of Classification Search

CPC .......... G06V 20/58; G06V 20/56; G06T 7/11; G06T 7/521; G06T 2207/10028; G06T 2207/20021; G06T 2207/30261

USPC .......................................................... 382/104

See application file for complete search history.

(56) References Cited

U.S. PATENT DOCUMENTS

| | | | | |
|---|---|---|---|---|
| 12,094,144 | B1 * | 9/2024 | Shree | G06T 5/77 |
| 2012/0128241 | A1 * | 5/2012 | Jung | H04N 21/435 382/165 |
| 2022/0244740 | A1 * | 8/2022 | Jiang | G01S 17/87 |
| 2022/0335649 | A1 * | 10/2022 | Nayak | G06T 7/74 |
| 2023/0029900 | A1 * | 2/2023 | Goel | G06V 20/647 |
| 2023/0087261 | A1 * | 3/2023 | Unnikrishnan | G06T 7/50 382/100 |

(Continued)

OTHER PUBLICATIONS

Cordts M., et al., "The Stixel World: A Medium-Level Representation of Traffic Scenes", arXiv:1704.00280v1, Apr. 2, 2017, 35 Pages.

(Continued)

*Primary Examiner* — Ali Bayat
(74) *Attorney, Agent, or Firm* — Dinsmore & Shohl LLP/QUALCOMM Incorporated

(57) ABSTRACT

The present disclosure provide techniques for processing image depth information. A method may include obtaining a depth image data structure representative of depth information for pixels in an image corresponding to coordinates in the image, wherein the depth image data structure comprises depth values associated with a subset of the pixels, and comprises: a plurality of tracks, each track representing a respective interval along a first dimension of the image, wherein: the subset of pixels are located at coordinates of the image represented by first track(s); and each first track includes respective depth information (e.g., a respective depth value and portion of a respective coordinate) for each respective pixel of respective one or more pixels of the subset of pixels located at respective one or more coordinates of the image represented by the track; and processing the depth image data structure.

20 Claims, 9 Drawing Sheets

(56) References Cited

U.S. PATENT DOCUMENTS

2023/0105331 A1* 4/2023 Cheng .................... G06F 18/24
345/419

OTHER PUBLICATIONS

Sawhney H.S., "3D Geometry from Planar Parallax", IEEE, 1994, pp. 929-934.

* cited by examiner

100

150

200

DEPTH IMAGE DATA STRUCTURE FOR STORING IMAGE DEPTH INFORMATION

INTRODUCTION

Field of the Disclosure

Aspects of the present disclosure relate to techniques for processing image depth information.

DESCRIPTION OF RELATED ART

The field of autonomous driving has observed significant advancements in recent years with the development of sophisticated perception systems that enable autonomous vehicles (also simply referred to herein as "vehicles") to understand and navigate their surroundings. For example, such perception systems may rely on processed information from sensors installed at, or on, a vehicle (e.g., essentially playing the role of the vehicle's eyes and ears) to sense an environment surrounding the vehicle, understand traffic patterns, locate and recognize object(s) in the surrounding environment, and/or safely maneuver the vehicle through the environment with little or no human input, among other tasks. Example sensors installed at the vehicle may include image sensors (e.g., cameras), light detection and ranging (LiDAR) equipment, sound navigation and ranging (SONAR) sensors, radio detection and ranging (RADAR) sensors, etc.

LiDAR is a remote sensing method that uses pulses from a laser to create a three-dimensional (3D) representation of a surveyed scene or object (e.g., a 3D scanning process). For example, a LiDAR sensor may emit pulses that reflect off objects in a scene and return to the sensor. The time it takes for the pulses to travel to and from the sensor may be used to calculate the distance to each object in the scene, based on the speed of light. In certain aspects, the calculated object distances may be stored as a collection of points, referred to as "point clouds." For example, in certain aspects, a point cloud may be the immediate digital output of the 3D scanning process. Each "point" included in a point cloud may refer to a data point in a 3D coordinate system representing a single spatial measurement on an object's surface in the scene. For example, each point may be expressed as a set of x, y, and z coordinates.

Accordingly, a point cloud may provide a real-time representation of a vehicle's surrounding environment, which may be processed to aid in the operation of the vehicle. In a first example, point cloud information may be processed to perform 3D object detection, which aims to predict the locations, sizes, and/or classes of objects of interest (e.g., critical objects), e.g., other vehicles, pedestrians, obstacles, cyclists, etc. in the scene. This geometric information may be utilized to determine distances from a vehicle to object(s) in the scene, as well as aid the vehicle in making informed decisions about its trajectory and speed, thereby helping to ensure safer navigation on roads.

In a second example, point clouds may be processed to cluster points of the point clouds into distinct semantic parts representing surfaces, objects, and/or structures in a scene, also referred to as "semantic segmentation" or simply "segmentation." Segmentation of point clouds enables vehicles to perceive and interact with their 3D environment by assigning semantic labels to points, facilitating object recognition, classification, and/or tracking. Segmentation may allow a vehicle to distinguish between critical objects, understand their relationships, and/or infer the overall structure of their environment. This semantic interpretation may be important for tasks such as obstacle avoidance, path planning, and/or object interaction, to name a few.

In certain aspects, point cloud processing may focus on performing 3D object detection and/or segmentation for less than all of the points in the point cloud. For example, a point cloud generated by a 3D sensor, such as a LiDAR sensor, deployed at a vehicle may include points representing the surfaces of object(s) in a scene in front of the vehicle. Instead of performing object detection and/or segmentation for every point in the point cloud, point cloud processing may focus on specific areas of interest, such as (1) areas on a road surface that the vehicle is traveling and/or (2) areas around vertical structures on or close to the road surface. Areas on the road surface may include an ego lane of the vehicle (e.g., the lane the vehicle is currently using and its boundaries) and/or neighboring lane(s) of the vehicle in the scene. Areas around vertical objects may include areas surrounding object(s) protruding from the road surface, such as buildings, trees, etc.

SUMMARY

One aspect provides a method for processing image depth information. A method generally includes obtaining a depth image data structure representative of depth information for an image comprising a plurality of pixels corresponding to a plurality of coordinates in the image, wherein the depth image data structure comprises a plurality of depth values associated with a subset of pixels of the plurality of pixels, wherein the depth image data structure comprises: a plurality of tracks, each track of the plurality of tracks representing a respective interval along a first dimension of the image, wherein: the subset of pixels are located at coordinates of the image represented by one or more tracks of the plurality of tracks; and each track of the one or more tracks includes respective depth information for each respective pixel of respective one or more pixels of the subset of pixels located at respective one or more coordinates of the image represented by the track, wherein the respective depth information for each respective pixel includes a respective depth value for the respective pixel and a portion of a respective coordinate of the respective pixel in the image; and processing the depth image data structure to detect one or more objects in the image.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for obtaining and processing a depth image data structure representative of depth information for an image. Although aspects herein describe the use of a depth image data structure for autonomous driving, in certain other aspects, depth image data structures may be used for various other applications, such as robotics, surveillance, and extended reality (XR), among others.

To facilitate point cloud processing, in certain aspects, a point cloud may be represented as a depth image. A depth image, also commonly referred to as a "depth map", is a two-dimensional (2D) array representative of depth information for an image. The 2D array may represent the x and y locations of one or more pixels in the image with their corresponding depth information (e.g., z values). For example, the depth information associated with a respective pixel in the image may be stored at a location in the depth image corresponding to a location of the respective pixel in the image. A depth image may be similar to a greyscale image where the intensity information is replaced by depth information.

In certain aspects, a depth image may be created by projecting 3D point cloud information into a 2D image plane. For example, a LiDAR sensor and a camera, such as implemented at, or on, a vehicle, may be used to perceive and collect sensor data about an environment. The LiDAR sensor may generate a point cloud, thereby providing a 3D representation of a scanned scene, such as in front of the vehicle as the vehicle travels down a road. Simultaneously, the camera may capture an image of the scene. Each point (e.g., with its corresponding x, y, and z coordinates) in the point cloud may correspond to only a single pixel (e.g., with its x and y coordinates) in the image. A pixel in the image, however, may have associated with it one or more points in the point cloud. The LiDAR sensor and the camera may be accurately calibrated and synchronized such that, in this example, they generate representations of the scene at the same time and with the same resolution (although this may not be the case for other examples). The 3D point cloud information may be projected into the 2D coordinate system of the image to generate a depth image. For example, a depth value of a 3D point in the 3D point cloud may be computed and stored at a pixel location, associated with a pixel in the 2D image, that corresponds to the 3D point in the point cloud (e.g., with the same x and y coordinates, given the resolution of the point cloud and the image are the same). This may be repeated for each point in the point cloud to generate the depth image.

Figure 1A:
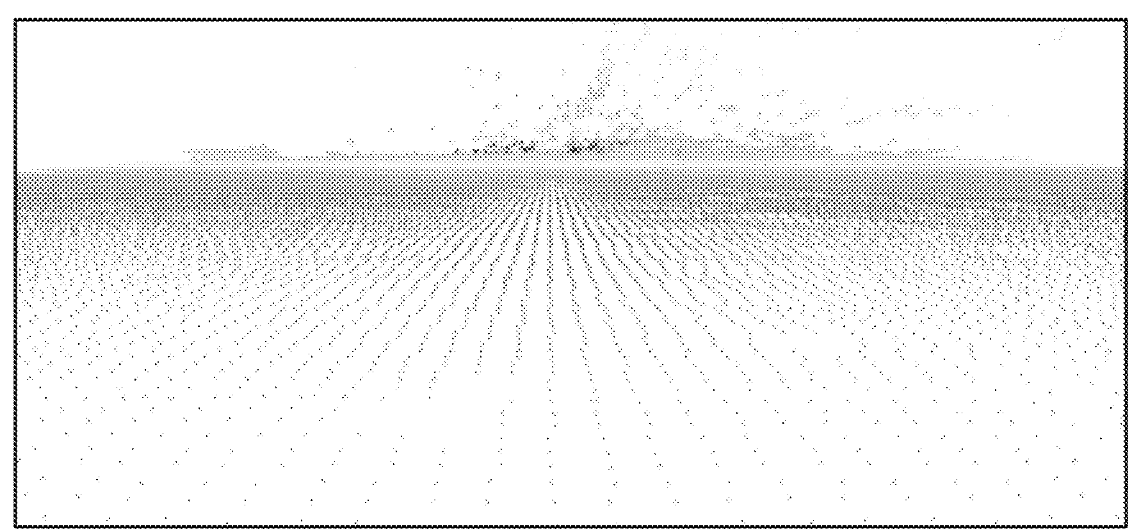
FIG. 1A depicts an example point cloud.
Figure 1B:
FIG. 1B depicts an example of the point cloud of FIG. 1A represented as a depth image.

FIG. 1A depicts an example point cloud 100, and FIG. 1B depicts an example representation of the point cloud 100 of FIG. 1A as a depth image 150. For example, using the steps described above, captured information for 3D points in point cloud 100 may be projected into a 2D image plane to create depth image 150. As shown in FIG. 1A, example point cloud 100 includes multiple points obtained for a scene, such as in front a vehicle. Each point may represent a single spatial measurement on an object's surface in the scene, such as obtained via a 3D sensor, such as a LiDAR sensor, or another suitable technique. Each point may be expressed as a set of x, y, and z coordinates, where the z coordinate represents a depth value for the respective point. Example points may include points on the road in front of the vehicle, points on buildings situated a further distance from the vehicle, and/or points corresponding to pedestrians, cyclists, and/or the like in the scene. The depth values for points in the point cloud may be used to augment a 2D image of the same scene captured by the point cloud to create depth image 150. As shown in FIG. 1B, depth image 150 may include depth values for multiple pixels, where a pixel's depth value is stored at the respective location of the pixel in the depth image 150.

The fusion of depth information with camera images allows for the creation of depth images, such as depth image 150 in FIG. 1B, which are useful tools for understanding the spatial characteristics of a camera-captured scene. In certain aspects, depth images help to empower pixel-level ranging, facilitate 3D object detection, and/or enable the identification of undefined obstacles, among others. For example, in the field of autonomous driving, the precise depth information included in depth images may enable vehicles to detect and assess obstacles on the road, accurately measuring distances to ensure effective navigation. A depth image may also be a useful tool for the segmentation of vertical structures in a scene, given the verticality of an object in the scene may be determined based on a search aligned with vertical tracks (e.g., columns) in the depth image. The vertical track-based segmentation may be represented as stixels (e.g., thin stick-like elements that constitute a column-wise segmentation of an image) in some examples.

While a useful tool for storing 3D information intended for 3D object detection and/or segmentation (e.g., such as vertical structures in automotive use cases), depth values from point clouds, such as generated based on depth sensor data, may be sparse and irregularly distributed in the depth image plane. For example, existing depth sensors, such as LiDAR sensors, generally generate sparse depth measurements due to their limited sensing scope, interferences from the environment, and/or economic considerations. For example, a LiDAR sensor may have a limited number of vertical line scans (e.g., 64 scan lines in the vertical direction), and thus provide only sparse measurements for a scene. Furthermore, increasing the density of measurements in the scene by the LiDAR sensor may be cost prohibitive. Projecting sparse depth measurements from a point cloud created from LiDAR measurements of a scene may result in the creation of a sparse depth image, which may not capture the full 3D information for the scene. For example, depth information for an image may be included in the sparse depth image for less than all pixels of the image.

In some other cases, a sparse depth image may be generated using less than all of the depth information included in a point cloud captured for a scene. For example, in the automotive context, generally no more than approximately ten percent (~10%) of the depth values included in a point cloud may be relevant to process for subsequent segmentation, such as to accurately identify and understand the road scene, enabling safe navigation for autonomous vehicles. In other example applications though, different percentages of depth values included in a point cloud may be relevant to process for subsequent segmentation. Accordingly, when generating a depth image based on this reduced set of depth information, a sparse depth image may be generated.

A technical problem related to the generation of sparse depth images, according to the techniques described above, includes the overlapping of depth image information in the 2D image space. For example, as described above, two or more depth values may be associated with the same pixel in the image. Thus, when the depth image is created, the depth information for this pixel may be stored at the pixel's corresponding location in the depth image thereby causing overlap of the information in the image space. This may be especially true for pixels representing objects at distances in the scene farther away from the camera used to capture the image. Overlapping of depth information in the image space may cause a loss of information, which may affect the accuracy of information collected for the scene. Inaccurate information relied on by perception systems may lead to a wide range of bad outcomes. For example, in the automotive context, inaccurate information included in a depth image may negatively impact driving tasks and/or lead to decision errors that pose safety challenges.

Figure 2:
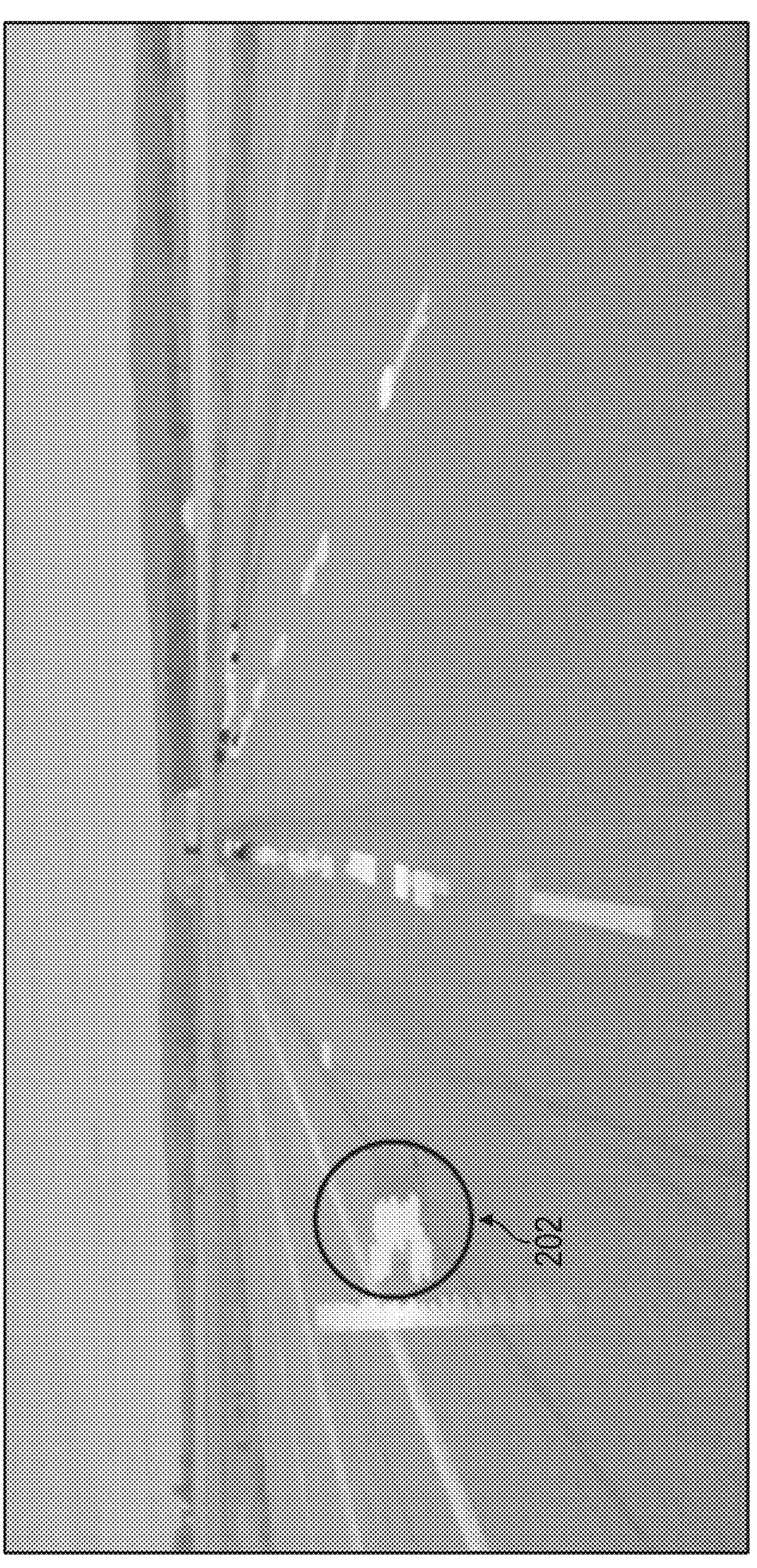
FIG. 2 depicts an example sparse depth image.

FIG. 2 depicts an example sparse depth image 200. As shown, depth image 200 represents depth information for pixels an image of a roadway, such as a road in front of a vehicle. Depth information may be included in depth image 200 for less than all pixels in the image represented by depth image 200. Further, a vertical object (e.g., such as an object on the road), represented by depth values at 202, which overlap in depth image 200, thereby leading to loss of depth information captured for the image.

Processing highly sparse and irregularly spaced depth values in a depth image also presents a technical problem in that it may be computationally expensive (e.g., may increase computational complexity), may require powerful hardware (e.g., central processing unit (CPU)) for real-time processing, may increase power consumption, may require a larger memory footprint, may increase latency in performing segmentation and/or 3D object detection for the scene, etc. In particular, processing a depth image may include performing an exhaustive search over the entire array of the image, track-by-track and element-by-element in each track, to obtain relevant depth information included in the depth image. Thus, where the depth image includes sparse depth information, an unnecessary amount of image memory reads may occur (e.g., memory reads at elements in the array corresponding to pixels where there does not exist any depth information). Put differently, storing depth information for one or more pixels in an image associated with the depth image, at the location of each pixel in the depth image corresponding to a location of the respective pixel in the image, may result in unnecessary reads as the image is processed (e.g., such as from left to right, track by track, when the depth image is vertically oriented or when the depth image is horizontally oriented from top to bottom, track by track). As an illustrative example, performing an exhaustive search for vertical structures along the tracks (e.g., columns when the depth image is vertically oriented) of a sparse depth image may be an inefficient way to process the data included in the depth image, due to an unnecessary amount of depth image memory reads.

The additional memory reads may not only increase the memory resource footprint, but also increase latency in processing. This presents a technical problem for real-time applications where efficient data processing is vital. For example, in the world of autonomous driving, even a 100 millisecond (ms) delay may be critical, potentially being the difference between life and death for a pedestrian and/or vehicle passenger. Therefore, the lag between receiving and responding to information may need to be minimized to equip these vehicles to respond to changing situations immediately and avoid bad outcomes.

Certain aspects described herein overcome the aforementioned technical problems associated with existing depth images, such as sparse depth images, and provide a technical benefit to the field of computer vision. For example, aspects described herein introduce a depth image data structure used to represent depth information for an image. The depth image data structure may include multiple tracks in a first dimension. Each track may represent an interval in a first dimension of the image, such as an x-interval in an x-dimension of the image. Depth information for pixels with coordinates (e.g., x-coordinates) in the first dimension that are included within a respective interval of a track in the depth image data structure may be stored in the respective track. The depth information stored for each pixel in the depth image data structure may include (1) depth information for the pixel and (2) information associated with a second dimension (e.g., a y-coordinate) of the pixel in the image. Pixel depth information included in a track in the depth image may be sorted according to the information associated with the respective second dimension and/or the respective depth information included for each pixel in the track.

As an illustrative example, depth information may be available for a first pixel in an image with coordinates (x1, y1) and a second pixel in the image with coordinates (x1, y2). A depth image data structure may be generated to represent depth information for the first pixel and the second pixel in the image. The depth image data structure may include tracks, where each track comprises an array of elements in the y-dimension. Each track may represent an x-interval along the x-dimension of the image, and each element may include depth information for a pixel of the image, along with information indicating the y-coordinate of the pixel in the image. Notably, there may not be a corresponding element in a track for each y-coordinate of the image, meaning that the location (e.g., index) of the element in the track may not correspond to the y-coordinate in the image of the pixel the element represents. Based on the x-coordinate for the first and second pixels being the same, depth information for the first and second pixels may be stored in a same track in the depth image data structure (e.g., a track representing an x-interval in the image including x1). Instead of storing the depth information for the first pixel in an element of the track having a location in the track that corresponds to the y-coordinate of the first pixel in the image and storing the depth information for the second pixel in an element of the track having a location in the track that corresponds to the y-coordinate of the second pixel in the image, the depth information for the first and second pixels may be stored in elements of the track having locations that do not necessarily correspond to the y-coordinates of the pixels in the image. For example, the respective y-coordinate in the image for each of the first and second pixels may be captured in different tuples stored in different elements in the same track. For example, a first tuple may be included in the track for the first pixel. The first tuple may indicate a first depth value for the first pixel and the y-coordinate associated with the first pixel (e.g., <first depth value, y1>). A second tuple may indicate a second depth value for the second pixel and the y-coordinate associated with the second pixel (e.g., <second depth value, y2>). These tuples may be sorted in the track associated with the first and second pixels based on their y-coordinates.

The depth image data structure described herein provides various advantages over conventional depth images used to store depth information for an image. For example, instead of storing depth information for pixels in the image at elements in the depth image that correspond to coordinates, e.g., y-coordinates, of the pixels in the image, the depth image data structure captures a portion of the coordinate information, e.g., the y-coordinate information, for the pixels in a tuple, which is then sorted in the depth image data structure. Sorting tuples in each track by their respective y-coordinates helps to facilitate traversal of the depth image data structure, such as during processing, without unnecessary reads. For example, as depicted in FIG. 3 below, sorting tuples by their y-coordinates may bring the depth information for pixels in the image to the top of the depth image data structure (e.g., where the depth image data structure does not store any information for pixels without depth information) such that traversal of the depth image data structure immediately locates depth information included in the data structure, even when the depth information is sparse.

The depth image data structure described herein also helps to avoid the loss of depth information, such as in cases where two depth values correspond to a single pixel in the image represented by the depth image data structure. For example, a first depth value may correspond to a pixel with (x1, y1) coordinates in an image, and a second depth value may correspond to the same pixel with (x1, y1) coordinates in the image. Per the techniques described above, a first tuple may be created for the first depth value (e.g., <first depth value, y1>) and a second tuple be created for the second depth value (e.g., <second depth value, y1>) in the depth image data structure. As such, depth information may be preserved, thereby improving the accuracy of the information used for processing and downstream computer vision tasks.

Example Workflow for Obtaining and Processing a Depth Image Data Structure

Figure 3:
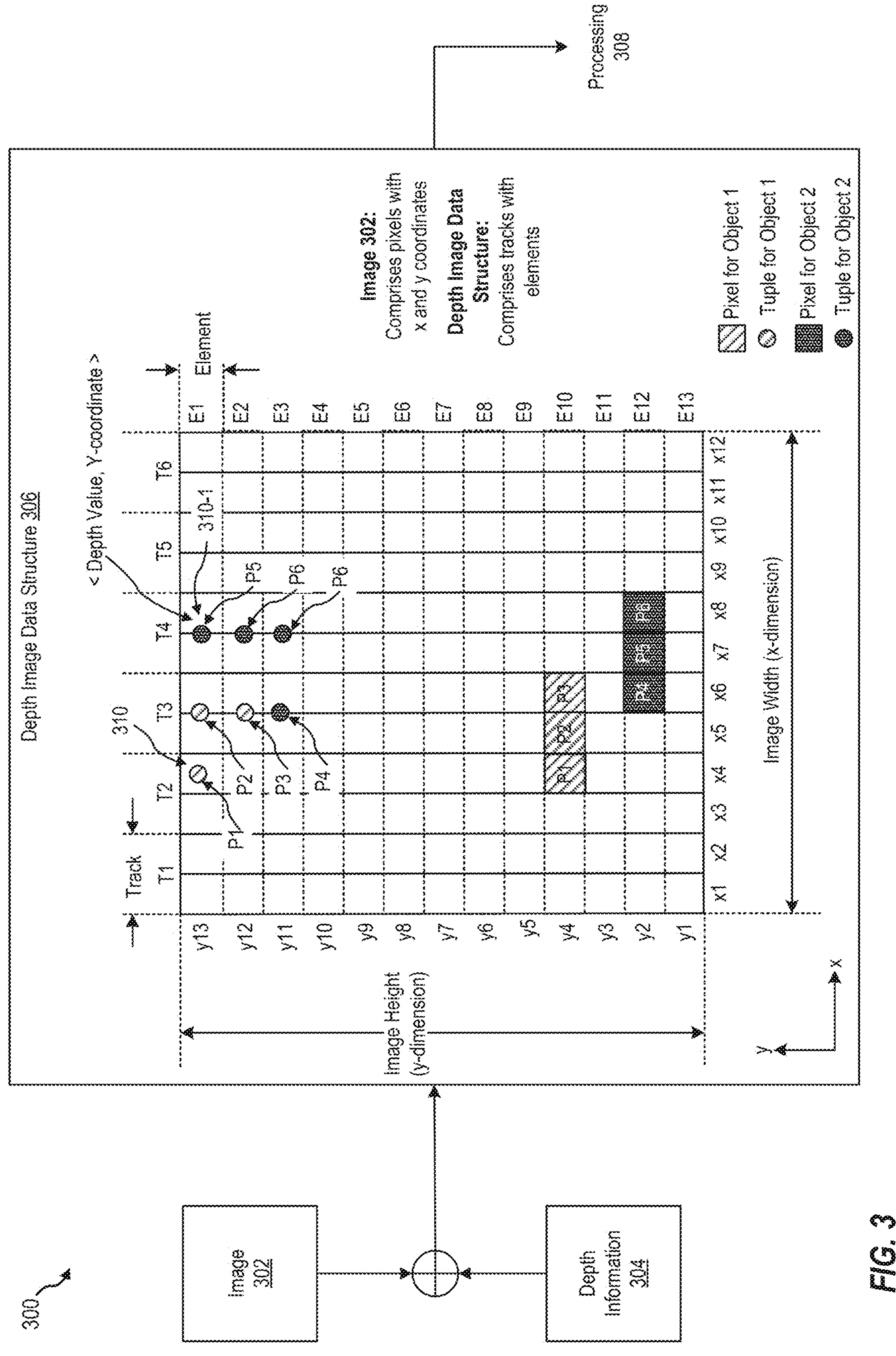
FIG. 3 depicts an example workflow for obtaining and processing a depth image data structure representative of depth information for an image.

FIG. 3 depicts an example workflow 300 for obtaining and processing a depth image data structure 306 representative of depth information for an image 302.

Workflow 300 begins with obtaining an image 302 and depth information 304. Image 302 may include pixels in a 2D space representing a scanned environment (e.g., also referred to herein as a "scene," such as a real-world scene). Each pixel may correspond to a respective set of x, y coordinates in the 2D space. The pixels may be associated with one or more objects present in the scene at the time the image 302 was generated. In certain aspects, the image 302 may be generated by image sensor(s), such as camera(s), configured to capture the scene at a particular point in time.

In this example, image 302 includes 156 pixels (e.g., 12×13 pixel image). Each pixel may correspond to a respective (x, y) coordinate in image 302. For example, a first pixel (P1) corresponding to a first object, may correspond to coordinates (x4, y4) in image 302, a second pixel (P2) corresponding to a second object, may correspond to coordinates (x5, y4) in image 302, etc. As described in detail below, only pixels P1-P6, corresponding to two objects in image 302, are highlighted in FIG. 3 to represent pixels in image 302 for which depth values exist in depth information 304.

Depth information 304 may include depth value(s) for object(s) in the same scene captured by image 302 at the same time (e.g., image 302 and depth information 304 may be synchronized in time). Thus, depth information 304 may represent depth information for pixels P1-P6 in image 302. Depth information 304 may include depth values representing the distance a surface of each object in the scene is from a viewpoint, such as of a device used to produce the depth information for the scene. In certain aspects, depth information 304 may include depth information for less than all pixels in image 302. For example, depth information 304 may include depth information for only 10% of the pixels in image 302 (e.g., sparse depth information). In this example, depth information 304 may include depth information (e.g., depth values) for only pixels P1-P6 in image 302, without including depth information for other pixels in image 302.

In certain aspects, depth information 304 is obtained from a 3D representation, such as a point cloud, generated for the scene. For example, 3D sensor(s), such as LiDAR sensor(s), may be used to produce point clouds, which are collections of points (e.g., associated with object(s)) in 3D space for the scene. Each point included in the point cloud may refer to a data point representing a single spatial measurement on an object's surface in the scene. Each point in the point cloud may be expressed as a set of x, y, and −z coordinates in the point cloud. Depth information 304 may comprise the z-coordinate associated with each point in the point cloud. Depth information 304 for each point in the point cloud may correspond to a single pixel in image 302. One pixel in image 302 may correspond to one or more points in the point cloud (e.g., one pixel may correspond to one or more depth values or z-coordinates included in the point cloud).

Workflow 300 then proceeds with projecting depth information, such as from a point cloud, into a 2D image plane to generate depth image data structure 306. For example, depth image data structure 306 may represent depth information 304 for pixels in image 302. In certain aspects, depth image data structure 306 may include depth values associated with only a subset of the pixels in image 302. For example, here, depth image data structure 306 may only include depth values associated with pixels P1-P6 in image 302.

Depth image data structure 306 may include multiple tracks in a first dimension. In certain aspects, a track may comprise an example array of elements in one dimension, which may be stored horizontally (e.g., array of elements in the x-dimension). In certain other aspects, a track may comprise an example array of elements in one dimension, which may be stored vertically (e.g., array of elements in the y-dimension). A collection of these tracks may create a depth image data structure 306. Each track included in the collection of tracks may have the same number of elements or a different number of elements. In certain aspects, where each track includes the same number of elements, then depth image data structure 306 may comprise a 2D array (e.g., where the elements' positions are each referenced by two indices, such as a track value and an element value (T, E)).

In example depth image data structure 306 shown in FIG. 3, the tracks (e.g., track 1 (T1), track 2 (T2), etc.) are arrays of elements (e.g., element 1 (E1), element 2 (E2), etc.) stored vertically. Tracks 1-6 may make up example depth image data structure 306 shown in FIG. 3. Each of tracks 1-6 may include the same number of elements. As such, example depth image data structure 306 may be a 2D array having multiple columns and rows, where the columns comprise the tracks and the rows comprise the elements of depth image data structure 306.

In certain aspects, each track of depth image data structure 306 may represent an x-interval (e.g., including one or more x-values) along the x-dimension of image 302. For example, in FIG. 3, a first track (T1) may include a portion of depth image data structure 306 corresponding to x-coordinates x1 and x2 in image 302, a second track (T2) may include another portion of depth image data structure 306 corresponding to x-coordinates x3 and x4 in image 302, a third track (T3) may include another portion of depth image data structure 306 correspond to x-coordinates x5 and x6 in image 302, etc.

In certain aspects, the size of the x-interval of image 302 represented by a track in depth image data structure 305 may be adjusted based on a subsequent stixel segmentation that is to be performed using depth image data structure 306. For example, subsequent stixel segmentation may use stixels three pixels in width along the x-axis of image 302. Thus, each track may be adjusted to represent three pixels wide along the x-axis of image 302 (e.g., may be adjusted from representing two pixel intervals in image 302, as currently shown in FIG. 3, to representing three pixel intervals in image 302). In certain aspects, adjusting the size of the respective x-interval of image 302 represented by each track in depth image data structure 306 may help to save computation time downstream for processing tasks, such as segmentation.

In certain aspects, each element of each track in depth image data structure 306 may include depth value information for a pixel, but the element location (e.g., index) (E1-E13) may not be indicative of the y-coordinate of the pixel. For example, element E1 of track T3 may store depth value information for a pixel at coordinate (x5, y4).

As shown in example depth image data structure 306, depth information for object 1, represented as three pixels P1-P3 in image 302, may be stored in depth image data structure 306 as three tuples 310 of <depth value, y-dimension in image 302> (or stored as other data representations including similar information). These three tuples may represent the depth information for pixels P1-P3 that make up object 1 in image 302. In certain aspects (such as shown in the example in FIG. 3), object 1 is represented by three pixels P1-P3 in image 302; thus, each tuple 310 may correspond to one depth value per pixel. In certain other aspects (not shown in FIG. 3), object 1 is represented by less than three pixels. Thus, at least two tuples, each associated with a unique depth value in depth information 304, may exist for at least one single pixel of object 1.

Similarly, depth information for object 2 may be stored in depth image data structure 306 as four tuples 310 of <depth value, y-dimension in image 302> (or stored as other data representations including similar information). These four tuples may represent the depth information for pixels P4-P6 that make up object 2 in image 302. In certain aspects (such as shown in FIG. 3), object 2 is represented by three pixels P4-P6, which is less than the four tuples 310 included in depth image data structure 306 (e.g., 3 pixels<4 tuples). Accordingly, at least two tuples 310 in depth image data structure 306, including depth information for object 2 in image 302, may include depth information for a same pixel of object 2 in image 302. For example, depth information for pixel P6 is stored in two tuples 310 in depth image data structure 306. In certain other aspects (not shown in FIG. 3), object 2 is represented by four pixels in image 302; thus, each tuple 310 in depth image data structure 306 may correspond to one depth value per pixel.

Generation of a tuple 310 for object 1 and/or object 2 in depth image data structure 306 may be performed by (1) identifying a depth value in depth information 304 associated with a pixel in image 302, (2) determining the (x, y) coordinates for the pixel in image 302, (3) identifying a track in depth image data structure that represents (e.g., includes) the x-coordinate of the pixel, (4) generating a tuple for the pixel as <depth value, y-coordinate>, (5) storing the tuple in the identified track, and (6) and sorting tuples in the track based on their corresponding y-coordinate and/or depth values.

As an illustrative example, to create tuple 310-1 in depth image data structure 306, depth information for object 2 may be determined to exist for pixel P5 in depth information 304. Pixel P5, with (x7, y2) coordinates in image 306, may have its x-coordinate within the x-interval of image 302 represented by track T4 (e.g., which represents x7 and ×8 in image 302). Thus, a tuple for pixel P5 may be generated in depth image data structure 306 in track T4, as shown. Instead, of placing the tuple 310-1 for pixel P5 at the location of the pixel in depth image data structure 306, such as in element E12 representing a y-interval include y-dimension y2 in image 302, the depth information may be included in a tuple 310-1 with reference to y2, e.g., <depth value, y2>, such as at element E1 of track T4. As shown in FIG. 3, tuple 310-1 may be included in track T4, which includes other depth information for other pixel(s) (e.g., P6) of object 2 (e.g., includes other tuples 310). In certain aspects, these tuples 310 in track T4 are sorted based on their corresponding y-coordinates. In certain aspects, these tuples are sorted based on their corresponding depth values.

In certain aspects, these steps used to generate a tuple 310 in depth image data structure 306 are performed by radially processing depth information 304, such as depth information 304 stored in a point cloud. Radially processing depth information in a point cloud to generate a depth image data structure 306 is described in detail below with respect to FIG. 6.

In certain aspects, depth image data structure 306 may not store depth information for pixels in image 302 other than the pixels with corresponding depth information found in depth information 304. For example, in FIG. 3, example depth image data structure 306 may only store depth information for pixels P1-P6, for which depth information exists, and not store depth information for other pixels of image 302 (not shown in FIG. 3).

By creating a tuple 310 in depth image data structure 306 for each depth value included in depth information 304, all depth information (e.g., such as corresponding to all points in a point cloud) may be preserved when moving to the image representation (e.g., when generating depth image data structure 306). Further, by encoding both the depth value and respective y-coordinate (e.g., of a pixel in image 302 related to the respective depth information) for each depth value in depth information 304 (e.g., such as corresponding to each point in a point cloud) into one sorted list for every track, information in tracks of depth image data structure 306 may be sorted from top to bottom. Thus, when traversing the depth image data structure 306 to read depth information for object(s) (e.g., such as object(s) of interest) in the scene, reading the depth image data structure where no data is present, or for pixels without depth information, may be avoided (e.g., thereby saving compute resources, saving memory resources, reducing processing latency, etc.). For example, the depth image data structure 306 may allow for a dramatic reduction in image read operations when traversing the entirety of the depth image data structure 306 (e.g., ~90% read reduction if only 10% of the depth image data structure 306 is populated).

It is noted that depth image data structure 306 shown in FIG. 3 is only one example depth image data structure 306 that may be created, and other example depth image data structures 306 for different scenes, different objects, with different depth information, with different tracks (e.g., representing different x-intervals in image 302), with different numbers of elements per track, etc. may be generated. Another example depth image data structure is depicted and described below with respect to FIG. 5B.

In certain aspects, after creating depth image data structure 306, depth image data structure 306 may be processed to perform one or more computer vision tasks (e.g., shown as processing 308 in FIG. 3). For example, depth image data structure 306 may be processed to perform 3D object detection, such as to detect one or more objects in image 302. As another example, depth image data structure 306 may be processed to perform segmentation, such as to segment out vertical structures from the scene in image 302. In certain aspects, the 3D object detection and/or segmentation may be performed to help aid the navigation of a vehicle. For example, a vehicle may be navigated through the scene (e.g., captured by image 302) based on the detected object(s) in the scene.

Example Depth Image Data Structures

Figure 4:
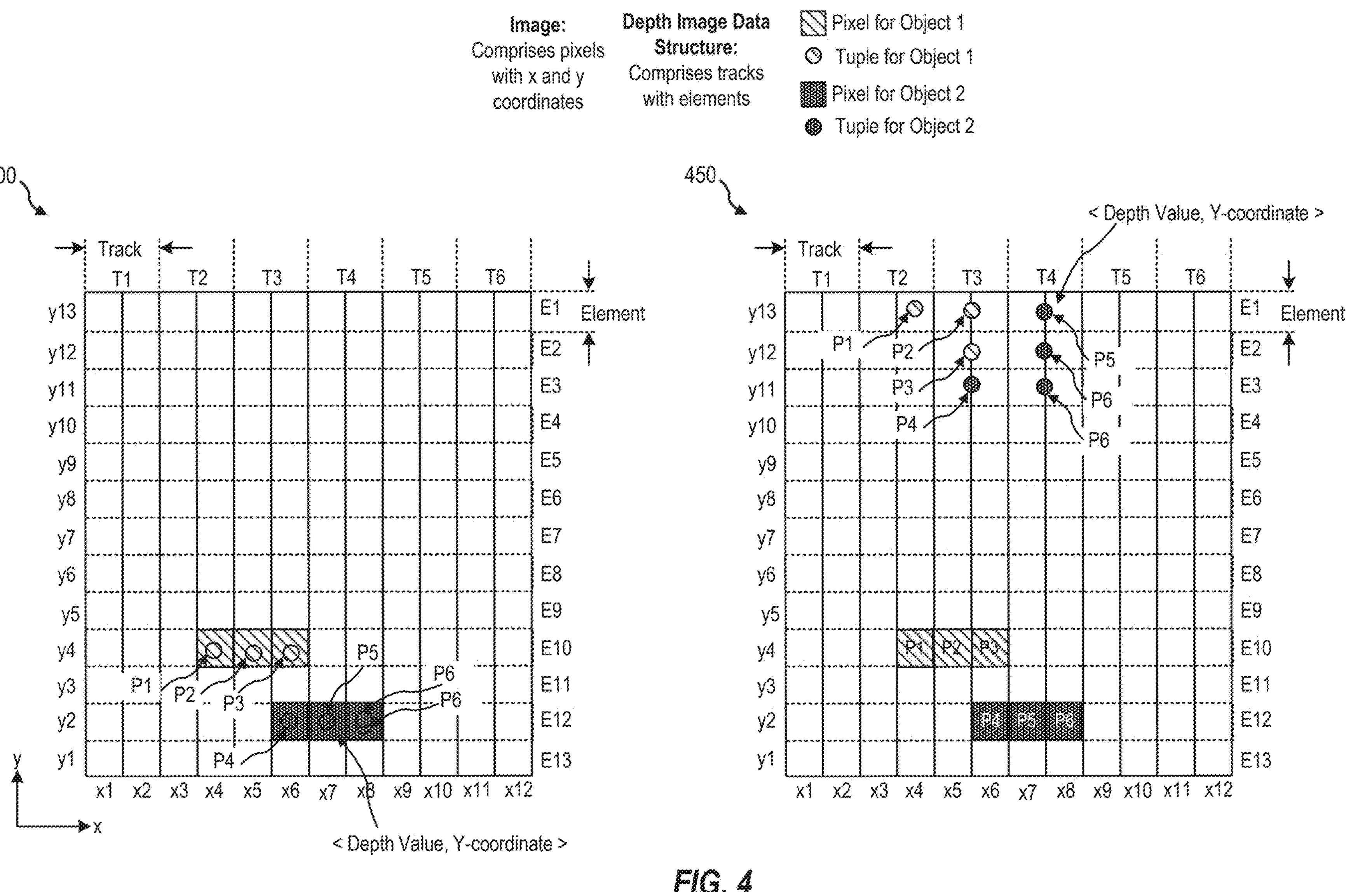
FIG. 4 depicts a comparison between a depth image data structure and a sparse depth image, which are both representative of depth information for a same image.

FIG. 4 depicts a comparison between a depth image data structure 450 and a sparse depth image 400. Both depth image data structure 450 and sparse depth image 400 may be used to represent depth information for a same image of a same scene.

In FIG. 4, depth image data structure 450 may represent the depth image data structure 306 described and depicted above with respect to FIG. 3. Thus, depth image data structure 450 may represent depth information for image 302. Sparse depth image 400 may be generated based on conventional techniques to also represent depth information for image 302. Sparse depth image 400 may include similar tracks and elements as depth image data structure 450 (e.g., such as the track and elements described above with respect to depth image data structure 306 in FIG. 3).

As shown, a location of where the depth information is stored in sparse depth image 400 is different than a location where the depth information is stored in depth image data structure 450. For example, in sparse depth image 400, the respective depth value for each pixel (e.g., each of pixels P1-P6 of objects 1 and 2) is stored in a track in sparse depth image 400 representing an x-interval in the image that includes the respective x-coordinate of the respective pixel and in an element in sparse depth image 400 representing a y-interval in the image that includes the respective y-coordinate of the respective pixel in image 302. In depth image data structure 450 the respective depth value for each pixel (e.g., each of pixels P1-P6 of objects 1 and 2) is stored in a track in sparse depth image 400 representing an x-interval in the image that includes the respective x-coordinate of the respective pixel, but may be stored in any element, such as the element at the top of the track in depth image data structure 450. For example, sorting of tuples created for depth information included in each track may determine an element where the respective depth information for the pixels is stored.

When processing sparse depth image 400, the entire 2D image plane of sparse depth image 400 may need to be iterated over, which may result in a larger amount of image memory reads. Alternatively, when processing depth image data structure 450, only the first depth values in each track may need to be processed, thereby enabling early breaking (e.g., which may result in a large reduction in image read operations, as described above).

Figure 5A:
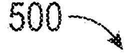
FIGS. 5A-5B depict another comparison between a depth image data structure and a sparse depth image, which are both representative of depth information for a same image.
Figure 5A:
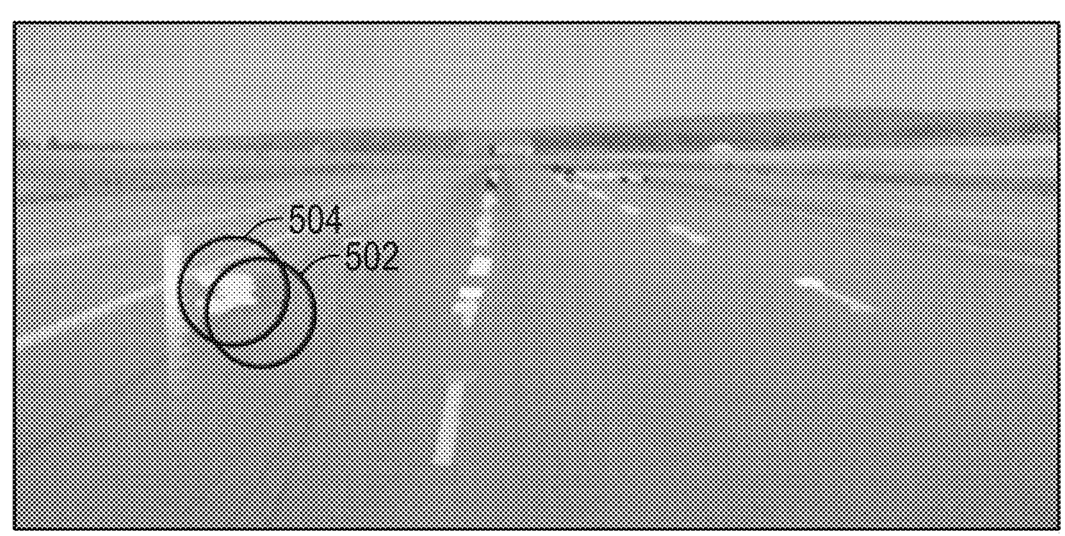
Figure 5B:
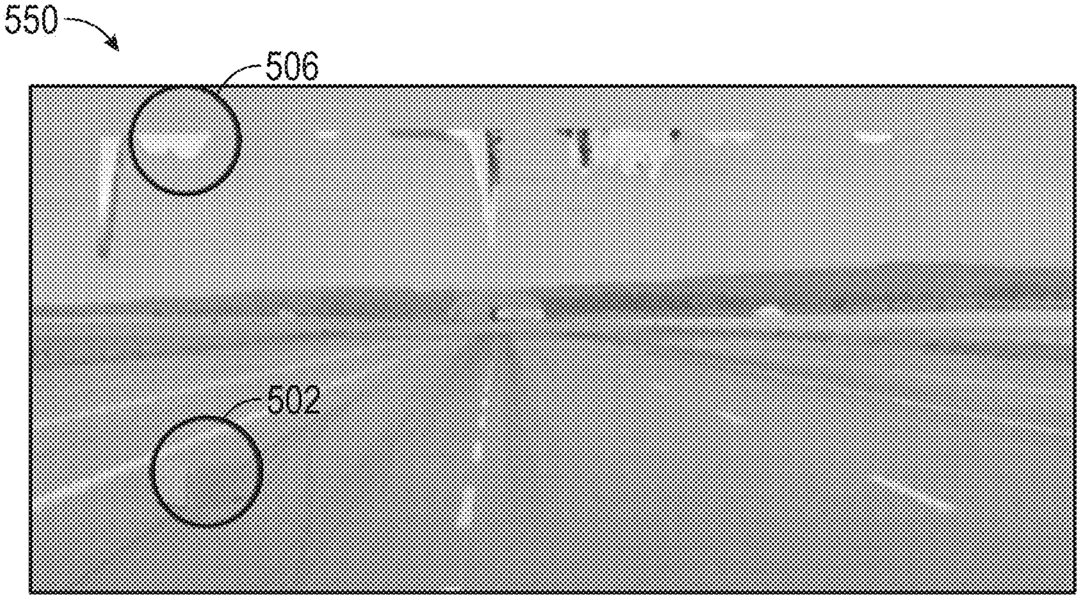

FIGS. 5A-5B depict another comparison between a real depth image data structure 550 and a real sparse depth image 500. Both depth image data structure 550 and sparse depth image 500 may be used to represent depth information for a same image of a same scene, which is shown in FIGS. 5A-5B.

In FIGS. 5A-5B, depth image data structure 550 and sparse depth image 500 may each include depth information for, at least, a box on the road in front of a vehicle. In each of depth image data structure 550 and sparse depth image 500 the box is represented by pixels shown at 502.

Depth information for the pixels of the box may be stored in sparse depth image 500 in a different location than where the depth information is stored in depth image data structure 550. For example, in sparse depth image 500, the depth values for the pixels of the box are stored in tracks and elements of sparse depth image 500 representing the respective x and y coordinates of the pixels in the image (e.g., shown at 504). Alternatively, in depth image data structure 550 the depth values for the pixels of the box are stored in tracks and elements of depth image data structure 550 representing only the respective x coordinates of the pixels in the image, which may be sorted (e.g., shown at 506).

Example Method for Generating a Depth Image Data Structure

Figure 6:
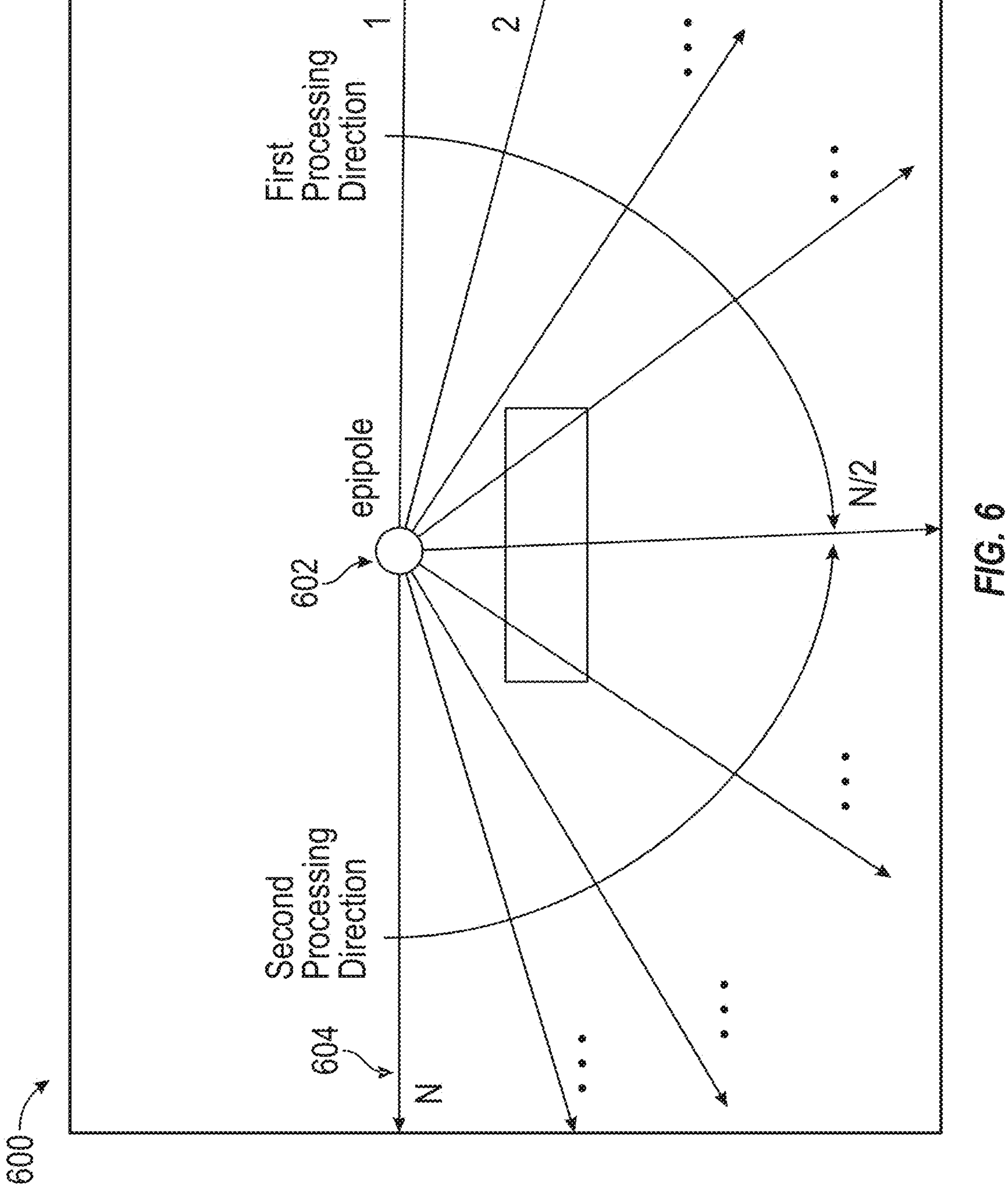
FIG. 6 depicts an example method for processing point cloud information to generate a depth image data structure.

FIG. 6 depicts an example method 600 for processing point cloud information to generate a depth image data structure, such as depth image data structure 306 in FIG. 3. In particular, method 600 may include steps for radially processing point cloud information to generate a depth image data structure.

For example, a point cloud and an image may be obtained for a same scene. Generating the depth image data structure may begin by identifying a first point in the point cloud corresponding to a first point in the image. The first point in the point cloud may represent a center point of the point cloud or another point in the point cloud. A first point in the image may represent a center point of the image or another point in the image. The first point in the point cloud is represented by first point 602 in FIG. 6.

Starting from first position 602 in the point cloud (e.g., corresponding to the first position in the image), points in the point cloud may be radially processed. For example, depth information for points on a first side of the image relative to the first position in the image may be processed first. Second, depth information for points on a second side of the image relative to the first position in the image may be processed. Processing the depth information may generate the depth image data structure.

Put differently, the image may be divided into two processing batches based on the first point identified in the image. A first processing batch may include pixels on a left side of the first point in the image, and a second processing batch may include pixels on a right side of the first point in the image. Depth information for a first set of points in the point cloud corresponding to pixels in the first processing batch may be processed first. Depth information for a second set of points in the point cloud corresponding to pixel in the second processing batch may be processed second.

Processing points in the points cloud may include gradually processing each epipolar line 604 in the point cloud. Starting with either epipolar line N or epipolar line 1, each epipolar line 604 may be gradually processed until the vertical epipolar line 604 at index N/2 is processed.

Due to the radial nature of the processing, appending new values into each track in a depth image data structure may result in depth information being sorted by row of the image in the depth image data structure. Accordingly, no additional sorting of depth information in each track may be required. The direction of the processing of the epipolar lines 604 will result in different row orderings. Optionally, the directions may be reversed to align the values in different orders.

Example Method for Processing Image Depth Information

Figure 7:
FIG. 7 depicts an example method for processing depth information for an image.
Figure 7:
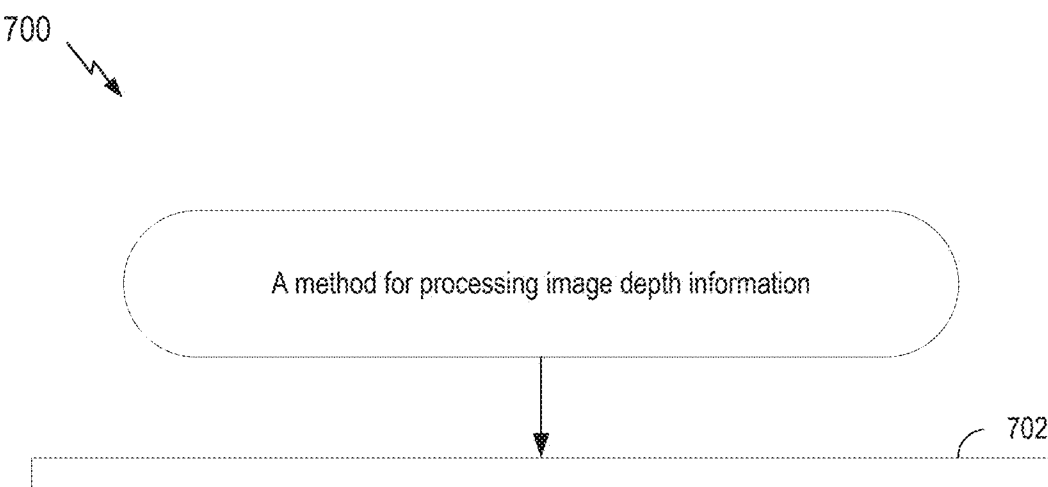

FIG. 7 depicts an example method for processing image depth information. In certain aspects, method 700, or any aspect related to it, may be performed by an apparatus, such as apparatus 900 of FIG. 9, which includes various components operable, configured, or adapted to perform the method 700.

Method 700 begins, at block 702, with obtaining a depth image data structure representative of depth information for an image comprising a plurality of pixels corresponding to a plurality of coordinates in the image. In certain aspects, the depth image data structure may include a plurality of depth values associated with a subset of pixels of the plurality of pixels. In certain aspects, the depth image data structure may include: a plurality of tracks, each track of the plurality of tracks representing a respective interval along a first dimension of the image, wherein: the subset of pixels are located at coordinates of the image represented by one or more tracks of the plurality of tracks; and each track of the one or more tracks includes respective depth information for each respective pixel of respective one or more pixels of the subset of pixels located at respective one or more coordinates of the image represented by the track, wherein the respective depth information for each respective pixel includes a respective depth value for the respective pixel and a portion of a respective coordinate of the respective pixel in the image.

Method 700 proceeds, at block 704, with processing the depth image data structure to detect one or more objects in the image.

In certain aspects, in each track of the one or more tracks, the respective depth information for each respective pixel may be ordered according to the portion of the respective coordinate of each respective pixel in the image corresponding to a second dimension of the image.

In certain aspects, in each track of the one or more tracks, the respective depth information for each respective pixel may be ordered according to the respective depth value.

In certain aspects, obtaining the depth image data structure at block 702 may include: obtaining a point cloud corresponding to the image; and starting from a first position in the point cloud corresponding to a first position in the image, processing points radially for depth information for a first side of the image relative to the first position in the image and process points radially for depth information for a second side of the image relative to the first point in the image to generate the depth image data structure.

In certain aspects, the depth image data structure may not store depth information for pixels of the plurality of pixels other than the subset of pixels.

In certain aspects, processing the depth image data structure at block 704 includes traversing each respective track of the one or more tracks to read the depth information for each respective pixel of the respective one or more pixels located at the respective one or more coordinates of the image represented by the respective track.

In certain aspects, method 700 further includes avoiding reading the depth image data structure where the depth image data structure does not store the depth information for the pixels of the plurality of pixels other than the subset of pixels when traversing each track of the one or more tracks.

In certain aspects, method 700 further includes segmenting the image into the one or more objects based on traversing each track of the one or more tracks, wherein the one or more objects comprise at least a vertical object in the image.

In certain aspects, the first dimension of the image may include an x-axis of the image.

In certain aspects, the plurality of tracks may include a plurality of columns or a plurality of rows of an array.

In certain aspects, the depth image data structure may include at least two depth values corresponding to a single pixel of the subset of pixels.

In certain aspects, method 700 may further include navigating a vehicle based on the detected one or more objects in the image.

Note that FIG. 7 is just one example of a method, and other methods including fewer, additional, or alternative steps are possible consistent with this disclosure.

Example Sensor and Computing System for Processing Image Depth Information

Figure 8:
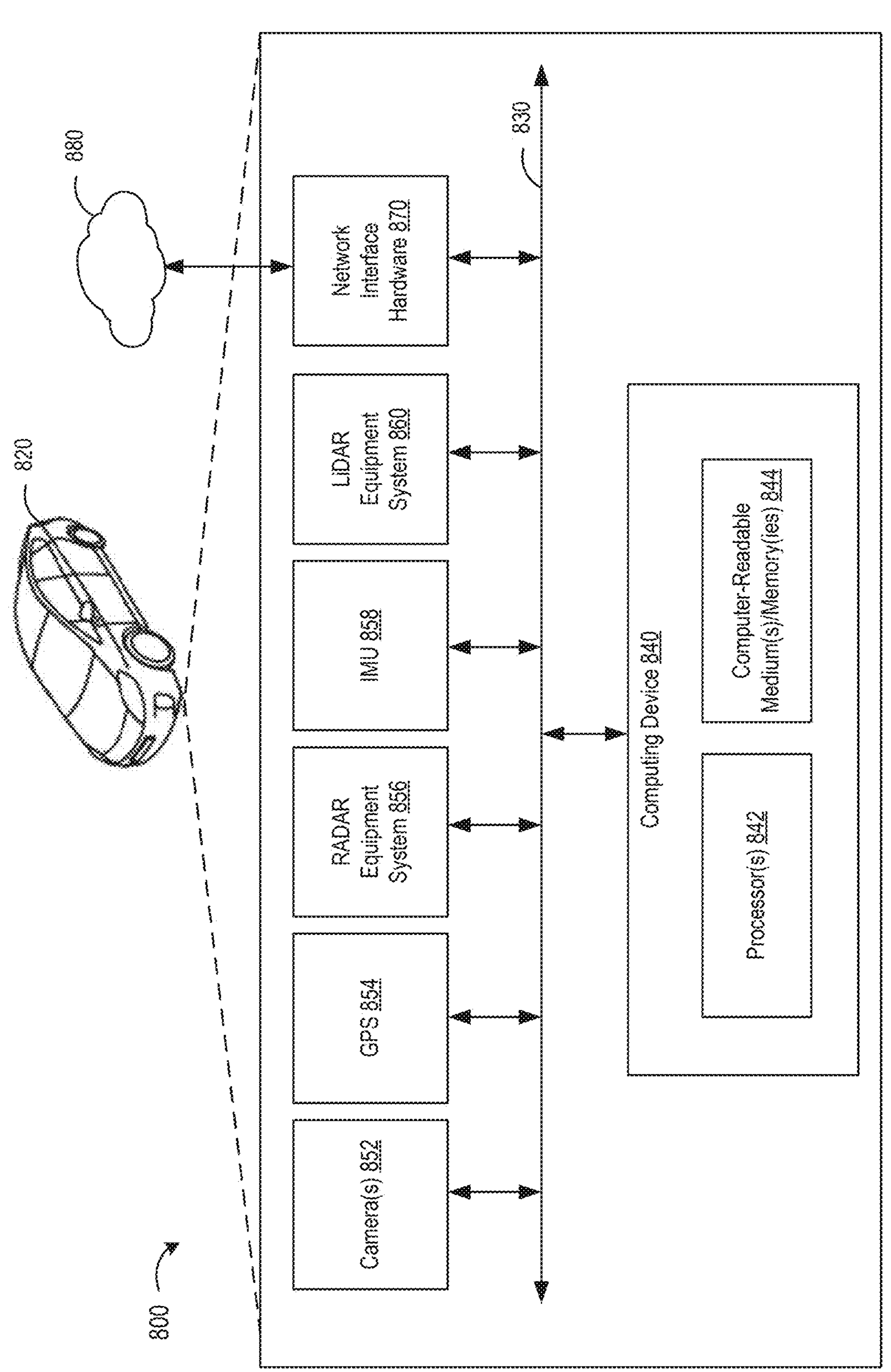
FIG. 8 depicts an example sensor and computing system.

FIG. 8 depicts an example sensor and computing system 800 equipped, for example, in a vehicle 820 or other apparatus, such as a robot. The vehicle 820 depicted in FIG. 8 is depicted by way of an example schematic of a vehicle including sensor resources and a computing device. Not every vehicle may be required to be equipped with the same set of sensor resources, nor may every vehicle be required to be configured with the same set of systems for perceiving attributes of an environment. FIG. 8 only provides one example configuration of sensor resources and systems equipped within a vehicle 820. It is understood that aspects described herein are made with reference to implementation with, on, or in a vehicle 820. However, this is merely an example. The vehicle 820 may be any other apparatus.

In particular, FIG. 8 provides an example schematic of the vehicle 820 including a variety of sensor resources, which may be utilized, by the vehicle 820 to perceive and collect sensor data about the environment. For example, the vehicle 820 may include a computing device 840 comprising one or more processors 842 and one or more non-transitory computer readable medium(s)/memory(ies) 844, one or more cameras 852, a global positioning system (GPS) 854, a RADAR equipment system 856, an inertial measurement unit (IMU) 858, a LiDAR equipment system 860, and network interface hardware 870.

In certain aspects, the vehicle 820 may not include all of the components depicted in FIG. 8. In certain aspects, the vehicle 820 may include one or more of the components, such as the one or more cameras 852, the GPS 854, the RADAR equipment system 856, the IMU 858, the LiDAR equipment system 860, a SONAR system, and/or the like. These and other components of the vehicle 820 may be communicatively connected to each other via a communication path 830.

The communication path 830 may be formed from any medium that is capable of transmitting a signal such as, for example, conductive wires, conductive traces, optical waveguides, or the like. The communication path 830 may also refer to the expanse in which electromagnetic radiation and their corresponding electromagnetic waves traverses. Moreover, the communication path 830 may be formed from a combination of mediums capable of transmitting signals. In one embodiment, the communication path 830 comprises a combination of conductive traces, conductive wires, connectors, and buses that cooperate to permit the transmission of electrical data signals to components such as processors, memories, sensors, input devices, output devices, and communication devices. Accordingly, the communication path 830 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. As used herein, the term "communicatively coupled" means that coupled components are capable of exchanging signals with one another such as, for example, electrical signals via conductive medium, electromagnetic signals via air, optical signals via optical waveguides, and the like.

The computing device 840 may be any device or combination of components comprising one or more processors 842 and one or more non-transitory computer readable medium(s)/memory(ies) 844. The one or more processors 842 may be any device(s) capable of executing the processor-executable instructions stored in the one or more non-transitory computer readable medium(s)/memory(ies) 844. For example, each of the one or more processors 842 may be an electric controller, an integrated circuit, a microchip, a computer, or any other computing device. The one or more processors 842 are communicatively coupled to the other components of the vehicle 820 by the communication path 830. Accordingly, the communication path 830 may communicatively couple any number of processors 842 with one another, and allow the components coupled to the communication path 830 to operate in a distributed computing environment. Specifically, each of the components may operate as a node that may send and/or receive data.

The one or more non-transitory computer readable medium(s)/memory(ies) 844 may comprise RAM, ROM, flash memories, hard drives, or any non-transitory memory device capable of storing processor-executable instructions such that the processor-executable instructions can be accessed and executed by the one or more processors 842. The machine-readable instruction set may comprise logic or algorithm(s) written in any programming language of any generation (e.g., 1GL, 2GL, 3GL, 4GL, or 5GL, where GL stands for "generation language") such as, for example, machine language that may be directly executed by the one or more processors 842, or assembly language, object-oriented programming (OOP), scripting languages, microcode, etc., that may be compiled or assembled into processor-executable instructions and stored in the one or more memories 844. Alternatively, the processor-executable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

The vehicle 820 may further include one or more cameras 852. The one or more cameras 852 may be any device having an array of sensing devices (e.g., a charge-coupled device (CCD) array or active pixel sensors) capable of detecting radiation in an ultraviolet wavelength band, a visible light wavelength band, or an infrared wavelength band. The one or more cameras 852 may have any resolution. The one or more cameras 852 may be an omni-direction camera and/or a panoramic camera. In certain aspects, one or more optical components, such as a mirror, fish-eye lens, and/or any other type of lens may be optically coupled to the one or more cameras 852. The image data collected by the one or more cameras 852 may be stored in the one or more non-transitory computer readable medium(s)/memory(ies) 844.

GPS 854, may be coupled to the communication path 830 and communicatively coupled to the computing device 840 of the vehicle 820. The GPS 854 is capable of generating location information indicative of a location of the vehicle 820 by receiving one or more GPS signals from one or more GPS satellites. The GPS signal communicated to the computing device 840 via the communication path 830 may include location information including a message, a latitude and longitude data set, a street address, a name of a known location based on a location database, and/or the like. Additionally, the GPS 854 may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas. The sensor data collected by the GPS 854 may be stored in the one or more non-transitory computer readable medium(s)/memory(ies) 844.

RADAR equipment system 856 measures the distance to objects over wide distances. It is also possible to measure the relative speed of the detected object. The RADAR equipment system 856 may be a continuous wave (CW), frequency-modulated continuous wave (FMCW), 3D-radio detection and ranging equipment (3D FMCW multiple-input and multiple-output (MIMO)), or 4D-radio detection and ranging equipment (4D FMCW MIMO). The sensor data collected by the RADAR equipment system 856 may be stored in the one or more non-transitory computer readable medium(s)/memory(ies) 844.

IMU 858 is an electronic device that measures and reports vehicle 820's specific force, angular rate, and/or the orientation of the vehicle 820, using a combination of accelerometers, gyroscopes, and/or magnetometers. The sensor data collected by the IMU 858 may be stored in one or more non-transitory computer readable medium(s)/memory(ies) 844.

LiDAR equipment system 860 is communicatively coupled to the communication path 830 and the computing device 840. LiDAR equipment system 860 may be a system and method of using pulsed laser light to measure distances from the LiDAR equipment system 860 to objects that reflect the pulsed laser light. A LiDAR equipment system 860 may be made as solid-state devices with few or no moving parts, including those configured as optical phased array devices where its prism-like operation permits a wide field-of-view without the weight and size complexities associated with a traditional rotating light detection and ranging equipment system 860. LiDAR equipment system 860 may be particularly suited to measuring time-of-flight, which in turn may be correlated to distance measurements with object(s) that are within a field-of-view of the LiDAR equipment system 860. By calculating the difference in return time of the various wavelengths of the pulsed laser light emitted by the LiDAR equipment system 860, a digital 3D representation of an object and/or or environment may be generated. The pulsed laser light emitted by the LiDAR equipment system 860 may include emissions operated in and/or near the infrared range of the electromagnetic spectrum, for example, having emitted radiation of about 905 nanometers. Vehicle 820 may use LiDAR equipment system 860 to provide detailed 3D spatial information for the identification of object(s) near the vehicle 820, as well as the use of such information in the service of systems for vehicular mapping, navigation and autonomous operations. In certain aspects, point cloud data collected by the LiDAR equipment system 860 may be stored in the one or more non-transitory computer readable medium(s)/memory(ies) 844.

In certain aspects, vehicle 820 may be equipped with a vehicle-to-vehicle (V2V) communication system, which may rely on network interface hardware 870. The network interface hardware 870 may be coupled to the communication path 830 and communicatively coupled to the computing device 840. The network interface hardware 870 may be any device capable of transmitting and/or receiving data with a network 880 and/or directly with another vehicle equipped with a V2V communication system. Accordingly, network interface hardware 870 can include a communication transceiver for sending and/or receiving any wired and/or wireless communication. For example, the network interface hardware 870 may include an antenna, a modem, a local area network (LAN) port, a Wi-Fi card, a worldwide interoperability for microwave access (WiMax) card, mobile communications hardware, near-field communication (NFC) hardware, satellite communication hardware, and/or any wired or wireless hardware for communicating with other networks and/or devices. In certain aspects, network interface hardware 870 includes hardware configured to operate in accordance with the Bluetooth wireless communication protocol. In certain aspects, network interface hardware 870 may include a Bluetooth send/receive module for sending and/or receiving Bluetooth communications to/from network 880 and/or another vehicle or device.

Example Apparatus for Processing Image Depth Information

Figure 9:
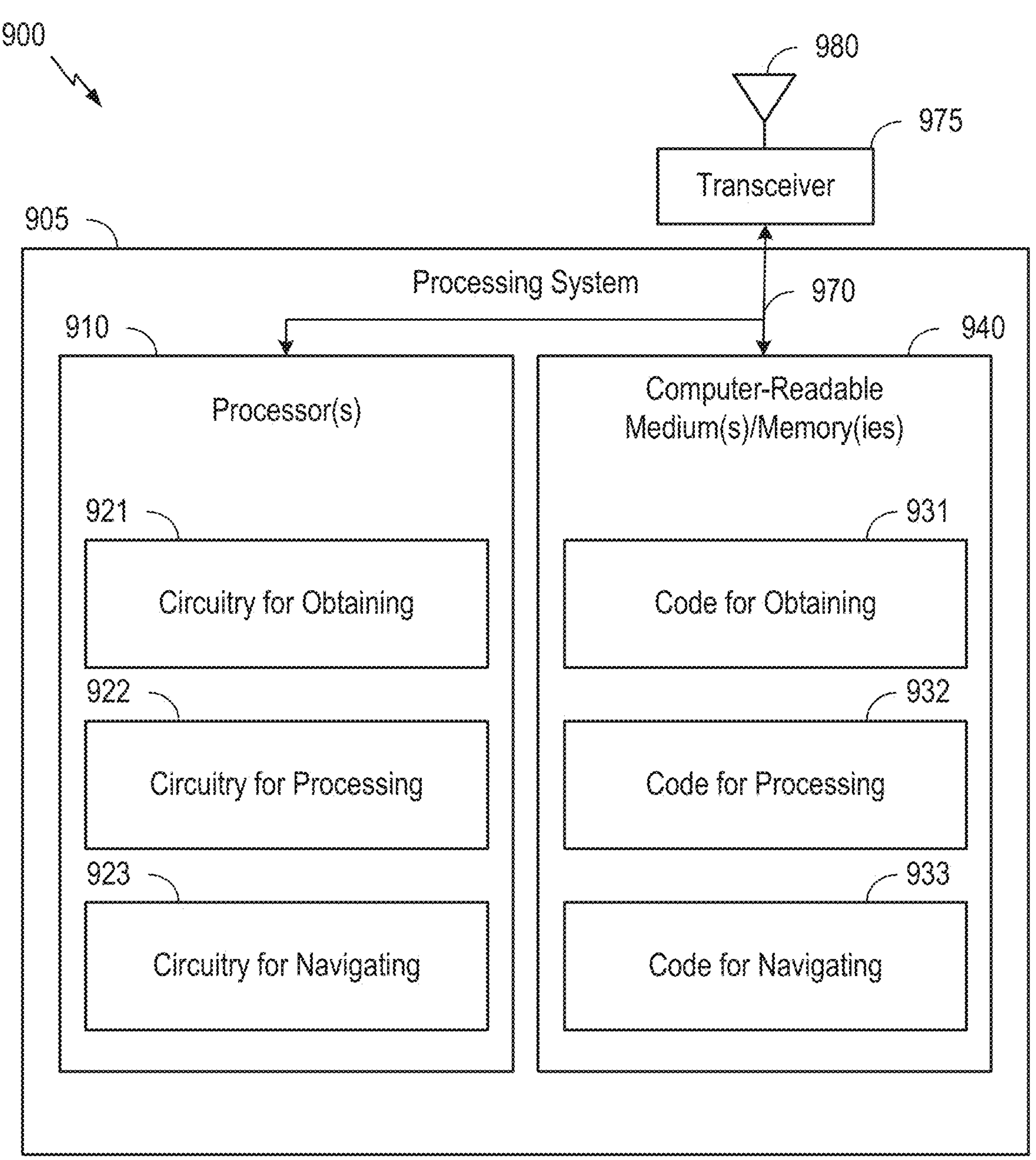
FIG. 9 depicts aspects of an example apparatus.

FIG. 9 depicts aspects of an example apparatus 900. In certain aspects, apparatus 900 is a computing device, such as computing device 840 depicted and described with respect to FIG. 8 (e.g., which may or may not be implemented by a vehicle 820).

The apparatus 900 includes a processing system 905, which may be coupled to a transceiver 975 (e.g., a transmitter and/or a receiver). The transceiver 975 is configured to transmit and receive signals for the apparatus 900 via an antenna 980, such as the various signals as described herein. The processing system 905 may be configured to perform processing functions for the apparatus 900, including processing signals received and/or to be transmitted by the apparatus 900.

The processing system 905 includes one or more processors 910. Generally, processor(s) 910 may be configured to execute computer-executable instructions (e.g., software code) to perform various functions, as described herein. The one or more processors 910 are coupled to a computer-readable medium/memory 940 via a bus 970. In certain aspects, the computer-readable medium/memory 940 is configured to store instructions (e.g., computer-executable code) that when executed by the one or more processors 910, enable and cause the one or more processors 910 to perform the method 700 described with respect to FIG. 7, or any aspect related to it, including any operations described in relation to FIG. 7. Note that reference to a processor performing a function of the apparatus 900 may include one or more processors performing that function of the apparatus 900, such as in a distributed fashion.

In the depicted example, computer-readable medium/memory 940 stores code 931 for obtaining, code 932 for processing, and code 933 for navigating. Processing of the code 931-933 may enable and cause the apparatus 900 to perform the method 700 described with respect to FIG. 7, or any aspect related to it.

The one or more processors 910 include circuitry configured to implement (e.g., execute) the code stored in the computer-readable medium/memory 940, including circuitry 921 for obtaining, circuitry 922 for processing, and circuitry 923 for navigating. Processing with circuitry 921-923 may enable and cause the apparatus 900 to perform the method 700 described with respect to FIG. 7, or any aspect related to it.

Apparatus 900 may be implemented in various ways. For example, apparatus 900 may be implemented within on-site, remote, or cloud-based processing equipment.

Apparatus 900 is just one example, and other configurations are possible. For example, in alternative aspects, aspects described with respect to apparatus 900 may be omitted, added, or substituted for alternative aspects.

Example Clauses

Implementation Examples are Described in the Following Numbered Clauses:

Clause 1: A method for processing image depth information, comprising: obtaining a depth image data structure representative of depth information for an image comprising a plurality of pixels corresponding to a plurality of coordinates in the image, wherein the depth image data structure comprises a plurality of depth values associated with a subset of pixels of the plurality of pixels, wherein the depth image data structure comprises: a plurality of tracks, each track of the plurality of tracks representing a respective interval along a first dimension of the image, wherein: the subset of pixels are located at coordinates of the image represented by one or more tracks of the plurality of tracks; and each track of the one or more tracks includes respective depth information for each respective pixel of respective one or more pixels of the subset of pixels located at respective one or more coordinates of the image represented by the track, wherein the respective depth information for each respective pixel includes a respective depth value for the respective pixel and a portion of a respective coordinate of the respective pixel in the image; and processing the depth image data structure to detect one or more objects in the image.

Clause 2: The method of Clause 1, wherein in each track of the one or more tracks, the respective depth information for each respective pixel is ordered according to the portion of the respective coordinate of each respective pixel in the image corresponding to a second dimension of the image.

Clause 3: The method of any one of Clauses 1-2, wherein in each track of the one or more tracks, the respective depth information for each respective pixel is ordered according to the respective depth value.

Clause 4: The method of any one of Clauses 1-3, wherein obtaining the depth image data structure comprises: obtaining a point cloud corresponding to the image; and starting from a first position in the point cloud corresponding to a first position in the image, processing points radially for depth information for a first side of the image relative to the first position in the image and process points radially for depth information for a second side of the image relative to the first point in the image to generate the depth image data structure.

Clause 5: The method of any one of Clauses 1-4, wherein the depth image data structure does not store depth information for pixels of the plurality of pixels other than the subset of pixels.

Clause 6: The method of Clause 5, wherein processing the depth image data structure comprises traversing each respective track of the one or more tracks to read the depth information for each respective pixel of the respective one or more pixels located at the respective one or more coordinates of the image represented by the respective track.

Clause 7: The method of Clause 6, further comprising avoiding reading the depth image data structure where the depth image data structure does not store the depth information for the pixels of the plurality of pixels other than the subset of pixels when traversing each track of the one or more tracks.

Clause 8: The method of any one of Clauses 6-7, further comprising segmenting the image into the one or more objects based on traversing each track of the one or more tracks, wherein the one or more objects comprise at least a vertical object in the image.

Clause 9: The method of any one of Clauses 1-8, wherein the first dimension of the image comprises an x-axis of the image.

Clause 10: The method of any one of Clauses 1-9, wherein the plurality of tracks comprise a plurality of columns or a plurality of rows of an array.

Clause 11: The method of any one of Clauses 1-10, wherein the depth image data structure comprises at least two depth values corresponding to a single pixel of the subset of pixels.

Clause 12: The method of any one of Clauses 1-11, further comprising: navigating a vehicle based on the detected one or more objects in the image.

Clause 13: One or more apparatuses, comprising: one or more memories comprising executable instructions; and one or more processors configured to execute the executable instructions and cause the one or more apparatuses to perform a method in accordance with any one of clauses 1-12.

Clause 14: One or more apparatuses, comprising: one or more memories; and one or more processors, coupled to the one or more memories, configured to cause the one or more apparatuses to perform a method in accordance with any one of Clauses 1-12.

Clause 15: One or more apparatuses, comprising: one or more memories; and one or more processors, coupled to the one or more memories, configured to perform a method in accordance with any one of Clauses 1-12.

Clause 16: One or more apparatuses, comprising means for performing a method in accordance with any one of Clauses 1-12.

Clause 17: One or more non-transitory computer-readable media comprising executable instructions that, when executed by one or more processors of one or more apparatuses, cause the one or more apparatuses to perform a method in accordance with any one of Clauses 1-12.

Clause 18: One or more computer program products embodied on one or more computer-readable storage media comprising code for performing a method in accordance with any one of Clauses 1-12.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled to" and "coupled with" generally encompass direct coupling and indirect coupling (e.g., including intermediary coupled aspects) unless stated otherwise. For example, stating that a processor is coupled to a memory allows for a direct coupling or a coupling via an intermediary aspect, such as a bus.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Reference to an element in the singular is not intended to mean only one unless specifically so stated, but rather "one or more." The subsequent use of a definite article (e.g., "the" or "said") with an element (e.g., "the processor") is not intended to invoke a singular meaning (e.g., "only one") on the element unless otherwise specifically stated. For example, reference to an element (e.g., "a processor," "a controller," "a memory," "a transceiver," "an antenna," "the processor," "the controller," "the memory," "the transceiver," "the antenna," etc.), unless otherwise specifically stated, should be understood to refer to one or more elements (e.g., "one or more processors," "one or more controllers," "one or more memories," "one more transceivers," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims.

What is claimed is:

1. An apparatus comprising:

one or more memories; and one or more processors coupled to the one or more memories, the one or more processors being configured to cause the apparatus to:

obtain a depth image data structure representative of depth information for an image comprising a plurality of pixels corresponding to a plurality of coordinates in the image, wherein the depth image data structure comprises a plurality of depth values associated with a subset of pixels of the plurality of pixels, wherein the depth image data structure comprises:

a plurality of tracks, each track of the plurality of tracks representing a respective interval along a first dimension of the image, wherein:

the subset of pixels are located at coordinates of the image represented by one or more tracks of the plurality of tracks;

each track of the one or more tracks includes respective depth information for each respective pixel of respective one or more pixels of the subset of pixels located at respective one or more coordinates of the image represented by the track, wherein the respective depth information for each respective pixel includes a respective depth value for the respective pixel and a portion of a respective coordinate of the respective pixel in the image; and process the depth image data structure to detect one or more objects in the image.

2. The apparatus of claim 1, wherein in each track of the one or more tracks, the respective depth information for each respective pixel is ordered according to the portion of the respective coordinate of each respective pixel in the image corresponding to a second dimension of the image.

3. The apparatus of claim 1, wherein in each track of the one or more tracks, the respective depth information for each respective pixel is ordered according to the respective depth value.

4. The apparatus of claim 1, wherein to obtain the depth image data structure, the one or more processors are configured to cause the apparatus to:

obtain a point cloud corresponding to the image; and starting from a first position in the point cloud corresponding to a first position in the image, process points radially for depth information for a first side of the image relative to the first position in the image and process points radially for depth information for a second side of the image relative to the first position in the image to generate the depth image data structure.

5. The apparatus of claim 1, wherein the depth image data structure does not store depth information for pixels of the plurality of pixels other than the subset of pixels.

6. The apparatus of claim 5, wherein to process the depth image data structure, the one or more processors are configured to traverse each respective track of the one or more tracks to read the depth information for each respective pixel of the respective one or more pixels located at the respective one or more coordinates of the image represented by the respective track.

7. The apparatus of claim 6, wherein the one or more processors are configured to cause the apparatus to avoid reading the depth image data structure where the depth image data structure does not store the depth information for the pixels of the plurality of pixels other than the subset of pixels when traversing each track of the one or more tracks.

8. The apparatus of claim 6, wherein:

the one or more processors are configured to cause the apparatus to segment the image into the one or more objects based on traversing each track of the one or more tracks; and the one or more objects comprise at least a vertical object in the image.

9. The apparatus of claim 1, wherein the first dimension of the image comprises an x-axis of the image.

10. The apparatus of claim 1, wherein the plurality of tracks comprise a plurality of columns or a plurality of rows of an array.

11. The apparatus of claim 1, wherein the depth image data structure comprises at least two depth values corresponding to a single pixel of the subset of pixels.

12. The apparatus of claim 1, wherein the one or more processors are configured to cause the apparatus to:

navigate a vehicle based on the detected one or more objects in the image.

13. A method for processing image depth information, comprising:

obtaining a depth image data structure representative of depth information for an image comprising a plurality of pixels corresponding to a plurality of coordinates in the image, wherein the depth image data structure comprises a plurality of depth values associated with a subset of pixels of the plurality of pixels, wherein the depth image data structure comprises:

a plurality of tracks, each track of the plurality of tracks representing a respective interval along a first dimension of the image, wherein:

the subset of pixels are located at coordinates of the image represented by one or more tracks of the plurality of tracks; and each track of the one or more tracks includes respective depth information for each respective pixel of respective one or more pixels of the subset of pixels located at respective one or more coordinates of the image represented by the track, wherein the respective depth information for each respective pixel includes a respective depth value for the respective pixel and a portion of a respective coordinate of the respective pixel in the image; and processing the depth image data structure to detect one or more objects in the image.

14. The method of claim 13, wherein in each track of the one or more tracks, the respective depth information for each respective pixel is ordered according to the portion of the respective coordinate of each respective pixel in the image corresponding to a second dimension of the image.

15. The method of claim 13, wherein in each track of the one or more tracks, the respective depth information for each respective pixel is ordered according to the respective depth value.

16. The method of claim 13, wherein obtaining the depth image data structure comprises:

obtaining a point cloud corresponding to the image; and starting from a first position in the point cloud corresponding to a first position in the image, processing points radially for depth information for a first side of the image relative to the first position in the image and process points radially for depth information for a second side of the image relative to the first position in the image to generate the depth image data structure.

17. The method of claim 13, wherein the depth image data structure does not store depth information for pixels of the plurality of pixels other than the subset of pixels.

18. The method of claim 17, wherein processing the depth image data structure comprises traversing each respective track of the one or more tracks to read the depth information for each respective pixel of the respective one or more pixels located at the respective one or more coordinates of the image represented by the respective track.

19. The method of claim 18, further comprising avoiding reading the depth image data structure where the depth image data structure does not store the depth information for the pixels of the plurality of pixels other than the subset of pixels when traversing each track of the one or more tracks.

20. One or more non-transitory computer-readable media comprising executable instructions that, when executed by one or more processors of an apparatus, cause the apparatus to perform operations comprising:

obtaining a depth image data structure representative of depth information for an image comprising a plurality of pixels corresponding to a plurality of coordinates in the image, wherein the depth image data structure comprises a plurality of depth values associated with a subset of pixels of the plurality of pixels, wherein the depth image data structure comprises:

a plurality of tracks, each track of the plurality of tracks representing a respective interval along a first dimension of the image, wherein:

the subset of pixels are located at coordinates of the image represented by one or more tracks of the plurality of tracks; and each track of the one or more tracks includes respective depth information for each respective pixel of respective one or more pixels of the subset of pixels located at respective one or more coordinates of the image represented by the track, wherein the respective depth information for each respective pixel includes a respective depth value for the respective pixel and a portion of a respective coordinate of the respective pixel in the image; and processing the depth image data structure to detect one or more objects in the image.

* * * * *